(No Model.)
J. RINGER.
GATE.
No. 339,695. Patented Apr. 13, 1886.
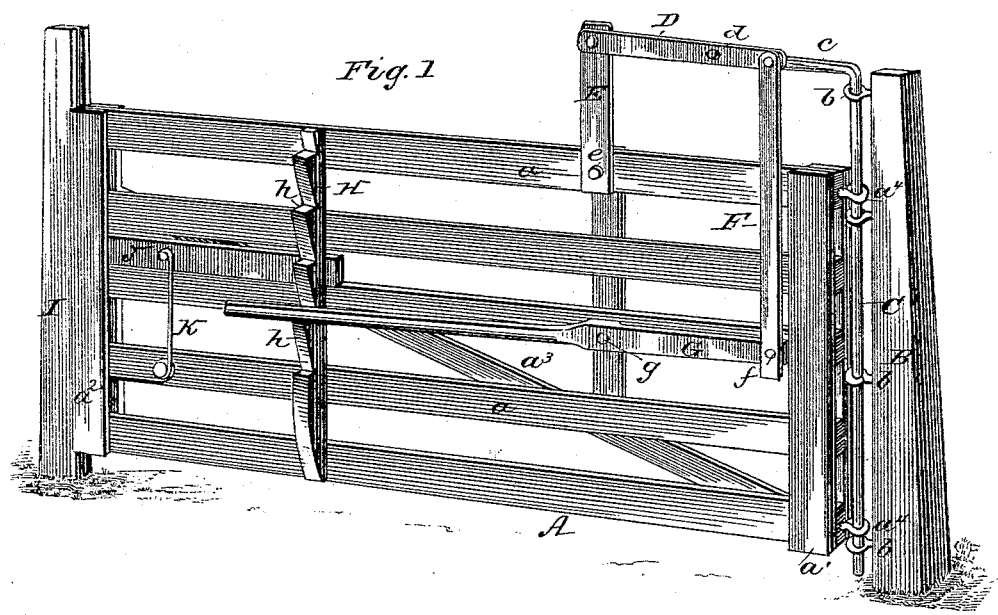
Fig. 1
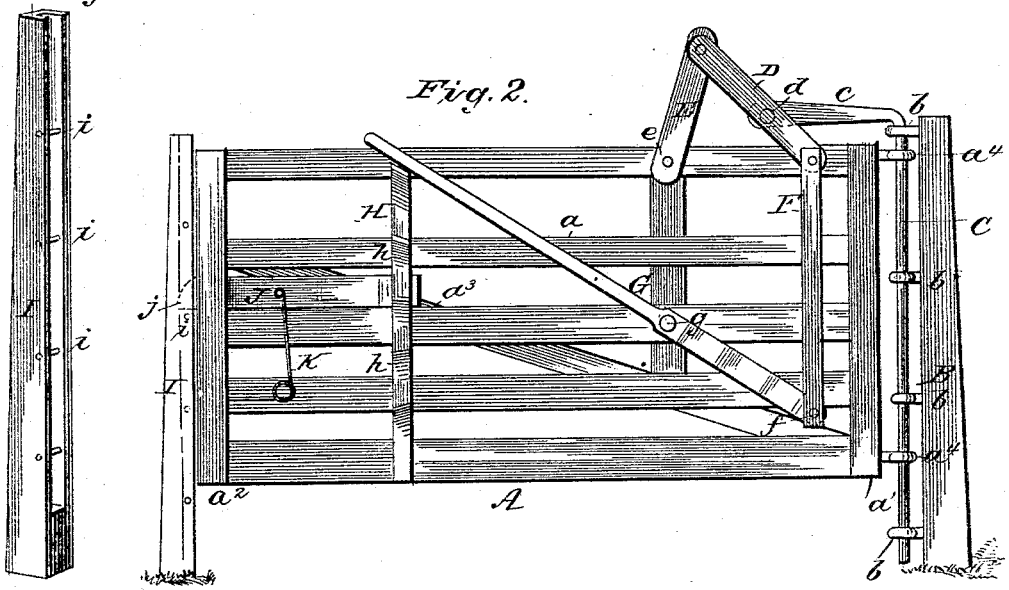
Fig. 3.
Fig. 2.
WITNESSES:
Fred. G. Dieterich
Wm. R. Davis
INVENTOR
James Ringer
BY J. H. MacDonald
Alfred Graber
ATTORNEYS

United States Patent Office.

JAMES RINGER, OF ARCADIA, OHIO.

GATE.

SPECIFICATION forming part of Letters Patent No. 339,695, dated April 13, 1886.

Application filed November 9, 1885. Serial No. 182,268. (No model.)

*To all whom it may concern:*

Be it known that I, JAMES RINGER, a citizen of the United States, residing at Arcadia, in the county of Hancock and State of Ohio, have invented certain new and useful Improvements in Gates; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to that class of gates which are capable of being adjusted vertically in order to swing clear from surface obstructions—such as snow-drifts, &c.; and the object of my invention is to provide for the ready manipulation of the swinging section and to secure the perfect locking of the gate in all its varying conditions of adjustment.

To the above purposes my invention consists in certain peculiar and novel features of construction and arrangement, as hereinafter described and claimed.

In order that my invention may be fully understood, I will proceed to describe it with reference to the accompanying drawings, in which—

Figure 1 is a perspective view of my improved gate at its lowest point of adjustment. Fig. 2 is a front elevation of the same at its highest point of adjustment. Fig. 3 is a detached perspective view of the locking-post.

In the said drawings, A designates the swinging section of the gate, and B designates the post upon which the gate is hinged. The gate or swinging section A is composed of a series of parallel horizontal bars, $a$, which are secured at their ends to vertical bars $a'$ $a^2$, a diagonal bar, $a^3$, being used to brace the gate.

The post B is provided with a series of eyes, $b$, and the gate A is provided with a series of similar eyes, $a^4$. A rod, C, extends through the eyes $a^4$ $b$, and its upper end is bent over horizontally, as shown at $c$, the said rod thus constituting the hinge of the gate.

An arm, D, is centrally hinged or pivoted at $d$ to the outer end of bent portion $c$, and to the outer end of this arm is pivoted an upright arm, E, the lower end of which is pivoted at $e$ to the upper bar, $a$, of the gate A.

To the opposite end of arm D is pivoted an arm, F, the lower end of which is pivoted at $f$ to one end of a hand-lever, G. The said hand-lever is pivoted, at $g$, upon the gate-frame.

H designates a rack-bar suitably secured in vertical position on the gate-frame, and having teeth $h$, with which the free end of the hand-lever G engages.

It will thus be seen that when the hand-lever G is raised at its outer end the gate A will be raised to clear any surface obstructions. By a slight lateral movement of the outer end of the hand-lever G it may be brought in engagement with the upper surface of one of the teeth $h$, and by this means the gate is suppported in any desired position.

The post I is hollowed out on one side, as is shown in Fig. 3, and is provided with a series of short bars, $i$, extending transversely across its open side.

The gate-frame A carries a sliding bar or latch, J, upon the outer end of which is formed a tooth, $j$, to take into the recesses between bars $i$ of post I, and to engage the upper side of said bars $i$, for the purpose of locking the gate in closed position, whether said gate be at its upper, lower, or intermediate points of adjustment.

A spring, K, is provided to hold the latch J in its outer position.

By virtue of the construction described the gate may be readily adjusted vertically, in order to clear obstructions, and will be as firmly supported as though it were hinged rigidly to the post B.

The latching parts also operate under all conditions of adjustment of the gate.

I am aware that gates have been constructed with a supporting-rod secured to the gate-post and gate. I am also aware that gates have been constructed with a lifting-lever engaging with pins on the end bar of the gate. Such I do not claim; but What I do claim is—

The combination, with the post B, having eyes *b*, the post I, having bars *i*, and the rod C, having the bent upper end, *c*, of the gate A, carrying latch J, with its spring K, the lever G, arms D E F, and rack-bar H, as described.

In testimony whereof I affix my signature in presence of two witnesses.

JAMES RINGER.

Witnesses:
W. H. ANDERSON,
G. E. LYNN.